United States Patent
Lee et al.

(10) Patent No.: US 9,557,910 B2
(45) Date of Patent: Jan. 31, 2017

(54) APPARATUS AND METHOD FOR TURNING E-BOOK PAGES IN PORTABLE TERMINAL

(75) Inventors: Sung-Min Lee, Seoul (KR); Dal-Kwang Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 304 days.

(21) Appl. No.: 13/232,493

(22) Filed: Sep. 14, 2011

(65) Prior Publication Data

US 2012/0084703 A1    Apr. 5, 2012

(30) Foreign Application Priority Data

Oct. 1, 2010 (KR) .................. 10-2010-0095815

(51) Int. Cl.
  *G06F 3/0488* (2013.01)
  *G06F 3/0483* (2013.01)
  *G06F 17/24* (2006.01)

(52) U.S. Cl.
  CPC ......... *G06F 3/04883* (2013.01); *G06F 3/0483* (2013.01); *G06F 17/241* (2013.01)

(58) Field of Classification Search
  CPC .... G06F 3/0483; G06F 3/0488; G06F 3/0485; G06F 3/04886; G06F 3/048; G06F 1/1626; G06F 2203/04803; G06F 17/217; G06F 1/1694; G09G 2380/14
  USPC ........................................ 715/776
  See application file for complete search history.

(56) References Cited

U.S. PATENT DOCUMENTS

| | | | |
|---|---|---|---|
| 5,463,725 A | 10/1995 | Henckel et al. | |
| 5,787,295 A | 7/1998 | Nakao | |
| 6,300,933 B1 | 10/2001 | Nagasaki et al. | |
| 6,448,986 B1 | 9/2002 | Smith | |
| 6,741,268 B1 | 5/2004 | Hayakawa | |
| 6,765,559 B2 * | 7/2004 | Hayakawa | 345/173 |
| 6,788,292 B1 | 9/2004 | Nako et al. | |
| 6,957,233 B1 | 10/2005 | Beezer et al. | |
| 6,989,815 B2 | 1/2006 | Liang et al. | |
| 6,992,687 B1 | 1/2006 | Baird et al. | |
| 7,032,187 B2 * | 4/2006 | Keely et al. | 715/863 |

(Continued)

FOREIGN PATENT DOCUMENTS

| | | |
|---|---|---|
| CN | 1688962 A | 10/2005 |
| CN | 1854992 A | 11/2006 |

(Continued)

OTHER PUBLICATIONS

Office Action dated May 21, 2014 in connection with U.S. Appl. No. 13/232,595, 21 pages.

(Continued)

*Primary Examiner* — Amy M Levy (57) ABSTRACT

An apparatus and method turn electronic book (e-book) pages in a portable terminal. The method determines whether a touch is input outside of a predetermined User Interface (UI) activation region of a screen of the portable terminal. The method determines whether a drag and release is input in a direction towards the predetermined UI activation region in response to detecting the touch. The method displays one of a preceding page and a next page on the screen in response to determining that the touch is outside of the predetermined UI activation region and that the drag and release is input in the direction towards the predetermined UI activation region.

12 Claims, 9 Drawing Sheets

(56) References Cited

U.S. PATENT DOCUMENTS

| | | | |
|---|---|---|---|
| 7,069,518 B2 | 6/2006 | Card et al. | |
| 7,185,274 B1 | 2/2007 | Rubin et al. | |
| 7,249,324 B2* | 7/2007 | Nakamura et al. | 715/776 |
| 7,289,102 B2* | 10/2007 | Hinckley et al. | 345/156 |
| 7,519,468 B2 | 4/2009 | Orr et al. | |
| 7,555,724 B2 | 6/2009 | Ho | |
| 7,574,669 B1 | 8/2009 | Braun et al. | |
| 7,714,837 B2 | 5/2010 | Hsieh | |
| 7,760,183 B2 | 7/2010 | Grady et al. | |
| 7,898,541 B2 | 3/2011 | Hong et al. | |
| 8,046,030 B2 | 10/2011 | Dunko | |
| 8,228,292 B1 | 7/2012 | Ruiz et al. | |
| 8,284,167 B2 | 10/2012 | Li et al. | |
| 8,479,122 B2 | 7/2013 | Hotelling et al. | |
| 8,499,251 B2 | 7/2013 | Petschnigg et al. | |
| 8,707,174 B2 | 4/2014 | Hinckley et al. | |
| 8,799,765 B1 | 8/2014 | MacInnis et al. | |
| 8,866,741 B2 | 10/2014 | Cho et al. | |
| 8,935,627 B2* | 1/2015 | Ryu et al. | G06F 3/0483 345/173 |
| 9,223,475 B1 | 12/2015 | Kim | |
| 2001/0024195 A1 | 9/2001 | Hayakawa | |
| 2002/0011990 A1 | 1/2002 | Anwar | |
| 2002/0143489 A1* | 10/2002 | Orchard | 702/141 |
| 2002/0167481 A1 | 11/2002 | Wong et al. | |
| 2002/0184189 A1 | 12/2002 | Hay et al. | |
| 2003/0020687 A1 | 1/2003 | Sowden et al. | |
| 2003/0048251 A1 | 3/2003 | Liang et al. | |
| 2003/0048305 A1 | 3/2003 | Liang et al. | |
| 2003/0206189 A1 | 11/2003 | DeMello et al. | |
| 2004/0006737 A1 | 1/2004 | Colbath et al. | |
| 2004/0008970 A1 | 1/2004 | Junkersfeld et al. | |
| 2004/0039750 A1 | 2/2004 | Anderson et al. | |
| 2004/0125081 A1 | 7/2004 | Hayakawa | |
| 2004/0135770 A1 | 7/2004 | Hayasaka | |
| 2004/0143796 A1 | 7/2004 | Lerner et al. | |
| 2004/0236774 A1 | 11/2004 | Baird et al. | |
| 2005/0005246 A1* | 1/2005 | Card et al. | 715/776 |
| 2005/0108233 A1 | 5/2005 | Metsatahti et al. | |
| 2005/0184956 A1* | 8/2005 | Wong et al. | 345/156 |
| 2006/0010396 A1 | 1/2006 | Beezer et al. | |
| 2006/0026251 A1 | 2/2006 | Cheng et al. | |
| 2006/0026521 A1 | 2/2006 | Hotelling et al. | |
| 2006/0050054 A1* | 3/2006 | Liang et al. | 345/156 |
| 2006/0125803 A1 | 6/2006 | Westerman et al. | |
| 2006/0277478 A1 | 12/2006 | Seraji et al. | |
| 2007/0061755 A1 | 3/2007 | Taboada et al. | |
| 2007/0085845 A1 | 4/2007 | Kikuchi et al. | |
| 2007/0164993 A1 | 7/2007 | Kao et al. | |
| 2007/0188450 A1 | 8/2007 | Hernandez et al. | |
| 2007/0290999 A1 | 12/2007 | Cho et al. | |
| 2008/0036743 A1 | 2/2008 | Westerman et al. | |
| 2008/0040692 A1* | 2/2008 | Sunday et al. | G06F 3/04883 715/863 |
| 2008/0211685 A1 | 9/2008 | Grady et al. | |
| 2008/0222552 A1* | 9/2008 | Batarseh et al. | 715/776 |
| 2008/0243828 A1 | 10/2008 | Reztlaff et al. | |
| 2008/0288887 A1* | 11/2008 | Wong et al. | 715/776 |
| 2009/0064027 A1* | 3/2009 | Navas Cadena et al. | 715/776 |
| 2009/0237367 A1* | 9/2009 | Ryu et al. | 345/173 |
| 2009/0262074 A1 | 10/2009 | Nasiri et al. | |
| 2009/0271703 A1 | 10/2009 | Chu et al. | |
| 2009/0271731 A1* | 10/2009 | Lin et al. | 715/776 |
| 2009/0271783 A1* | 10/2009 | Hsieh et al. | 717/178 |
| 2010/0045616 A1* | 2/2010 | Li et al. | 345/173 |
| 2010/0060475 A1 | 3/2010 | Choi | |
| 2010/0060664 A1 | 3/2010 | Kilpatrick, II et al. | |
| 2010/0088641 A1 | 4/2010 | Choi | |
| 2010/0117975 A1 | 5/2010 | Cho | |
| 2010/0134412 A1* | 6/2010 | Narita | 345/156 |
| 2010/0164888 A1* | 7/2010 | Okumura et al. | 345/173 |
| 2010/0175018 A1* | 7/2010 | Petschnigg et al. | 715/776 |
| 2010/0295790 A1* | 11/2010 | Yu | 345/168 |
| 2011/0010617 A1* | 1/2011 | Kim et al. | 715/273 |
| 2011/0047460 A1 | 2/2011 | Choe | |
| 2011/0050591 A1 | 3/2011 | Kim et al. | |
| 2011/0099513 A1 | 4/2011 | Ameline | |
| 2011/0153330 A1 | 6/2011 | Yazdani et al. | |
| 2011/0163955 A1 | 7/2011 | Nasiri et al. | |
| 2011/0167384 A1* | 7/2011 | Yabu et al. | 715/810 |
| 2011/0209039 A1 | 8/2011 | Hinckley et al. | |
| 2011/0209057 A1 | 8/2011 | Hinckley et al. | |
| 2011/0210932 A1 | 9/2011 | Ryu et al. | |
| 2011/0296334 A1* | 12/2011 | Ryu et al. | 715/776 |
| 2011/0298762 A1* | 12/2011 | Lin | 345/204 |
| 2011/0316888 A1 | 12/2011 | Sachs et al. | |
| 2012/0017167 A1* | 1/2012 | Lee et al. | 715/776 |
| 2012/0047470 A1* | 2/2012 | Martinoli | G06F 3/0483 715/863 |
| 2012/0066581 A1 | 3/2012 | Spalink | |
| 2012/0066591 A1 | 3/2012 | Hackwell | |
| 2012/0075327 A1 | 3/2012 | Mackenzie | |
| 2012/0089938 A1 | 4/2012 | Homma et al. | |
| 2012/0105464 A1 | 5/2012 | Franceus | |
| 2012/0124505 A1 | 5/2012 | St. Jacques, Jr. | |
| 2012/0127109 A1 | 5/2012 | Nishio et al. | |
| 2012/0154293 A1 | 6/2012 | Hinckley et al. | |
| 2012/0154294 A1 | 6/2012 | Hinckley et al. | |
| 2012/0159373 A1* | 6/2012 | Archer et al. | 715/776 |
| 2012/0188154 A1 | 7/2012 | Lee | |
| 2012/0311438 A1* | 12/2012 | Cranfill et al. | 715/256 |
| 2013/0219321 A1 | 8/2013 | Cranfill et al. | |
| 2013/0298067 A1 | 11/2013 | Parker et al. | |

FOREIGN PATENT DOCUMENTS

| | | |
|---|---|---|
| CN | 101082837 A | 12/2007 |
| CN | 101582007 A | 11/2009 |
| CN | 10-1655766 A | 2/2010 |
| CN | 201491069 A | 5/2010 |
| CN | 101794191 | 8/2010 |
| CN | 201576359 U | 9/2010 |
| EP | 2104026 A2 | 9/2009 |
| JP | H 06-231186 A | 8/1994 |
| JP | H 10161619 A | 6/1998 |
| JP | 2000-123044 A | 4/2000 |
| JP | 2000-163193 A | 6/2000 |
| JP | 2000-242390 A | 9/2000 |
| JP | 2002-082878 A | 3/2002 |
| JP | 2002140159 A | 5/2002 |
| JP | 2002341991 A | 11/2002 |
| JP | 2003-140802 A | 5/2003 |
| JP | 2003157134 A | 5/2003 |
| JP | 2004-288208 A | 10/2004 |
| JP | 2004-355106 A | 12/2004 |
| JP | 2005165760 A | 6/2005 |
| JP | 2006-053605 A | 2/2006 |
| JP | 2007310888 A | 11/2007 |
| JP | 2010-170573 A | 8/2010 |
| JP | 2013-521547 A | 6/2013 |
| KR | 10-2007-0039613 A | 4/2007 |
| KR | 1020090101035 | 9/2009 |
| KR | 1020100033242 | 3/2010 |
| KR | 10-2011-0019019 | 2/2011 |
| WO | WO 2009/099268 A1 | 8/2009 |
| WO | 2009128593 A1 | 10/2009 |
| WO | WO 2010041826 A2 | 4/2010 |
| WO | WO 2010080258 A2 | 7/2010 |

OTHER PUBLICATIONS

Office Action dated Jun. 3, 2014 in connection with U.S. Appl. No. 13/232,431, 24 pages.

Office Action dated Aug. 12, 2014 in connection with U.S. Appl. No. 13/232,312, 33 pages.

Cancel dictionary definition. Retrieved from [http://dictionary.references.com/browse/cancel] on Jul. 14, 2014, 4 pages.

Office Action dated Jan. 3, 2014 in connection with U.S. Appl. No. 13/232,595, 18 pages.

Office Action dated Nov. 15, 2013 in connection with U.S. Appl. No. 13/232,431, 18 pages.

Office Action dated Mar. 26, 2014 in connection with U.S. Appl. No. 13/232,812, 18 pages.

(56) References Cited

OTHER PUBLICATIONS

Office Action dated Nov. 19, 2014 in connection with U.S. Appl. No. 13/232,595; 21 pages.
Office Action dated Nov. 28, 2014 in connection with U.S. Appl. No. 13/232,431; 21 pages.
Office Action dated Dec. 2, 2014 in connection with U.S. Appl. No. 13/232,493; 27 pages.
Notice of Preliminary Rejection dated Jun. 9, 2015 in connection with Japanese Patent Application No. 2011-210134; 9 pages.
Notice of Patent Grant dated Jun. 9, 2015 in connection with Japanese Patent Application No. 2011-217512; 5 pages.
Final Office Action dated May 14, 2015 in connection with U.S. Appl. No. 13/232,595; 16 pages.
Final Office Action dated Jul. 20, 2015 in connection with U.S. Appl. No. 13/232,812; 17 pages.
Yamaki, H.; "Adobe Acrobat 6.0 PDF Technical Manual"; Windows Acrobat 6.0 Portable Document Format; Nov. 10, 2003; 3 pages.
Office Action dated Mar. 20, 2015 in connection with U.S. Appl. No. 13/232,431; 20 pages.
Office Action dated Jan. 28, 2015 in connection with U.S. Appl. No. 13/232,812; 20 pages.
The First Office Action dated Jul. 27, 2015 in connection with Chinese Patent Application No. 2011-10306720.1; 21 pages.
The First Office Action dated Aug. 6, 2015 in connection with Chinese Patent Application No. 2011-10295196.8; 30 pages.
The First Office Action dated Sep. 2, 2015 in connection with Chinese Patent Application No. 2011-10307804.2; 51 pages.
Details of the First Office Action dated Sep. 15, 2015 in connection with Chinese Patent Application No. 2011-10303438.3; 29 pages.
Notice of Patent Grant dated Oct. 27, 2015 in connection with Japanese Patent Application No. 2011-211935; 5 pages.
Notice of Patent Grant dated Oct. 27, 2015 in connection with Japanese Patent Application No. 2011-210134; 5 pages.
Notice of Preliminary Rejection dated Oct. 27, 2015 in connection with Japanese Patent Application No. 2011-217625; 9 pages.
Non-Final Office Action dated Oct. 30, 2015 in connection with U.S. Appl. No. 13/232,431; 19 pages.
Non-Final Office Action dated Nov. 13, 2015 in connection with U.S. Appl. No. 13/232,595; 16 pages.
Non-Final Office Action dated Feb. 5, 2016 in connection with U.S. Appl. No. 13/232,812; 12 pages.
U.S. Office Action issued for U.S. Appl. No. 13/232,431 dated Jun. 17, 2016, 14 pgs.
U.S. Office Action issued for U.S. Appl. No. 13/232,812 dated Jun. 8, 2016, 16 pgs.
Chinese Office Action issued for CN 201110295196.8 dated Apr. 19, 2016, 38 pgs.
Chinese Office Action issued for CN 201110303438.3 dated May 20, 2016, 15 pgs.
Chinese Office Action issued for CN 201110307804.2 dated May 16, 2016, 31 pgs.
Japanese Notice of Patent Grant dated Aug. 9, 2016 in connection with Japaense Application No. 2011-217625, 5 pages.
Notice of Preliminary Rejection dated Sep. 23, 2016 in connection with Korean Application No. 10-2010-0136624, 8 pages.
Third Office Action dated Nov. 7, 2016 in connection with Chinese Application No. 201110307804.2, 33 pages.
Extended European Search Report dated Sep. 5, 2016 in connection with European Application No. 11183429.7, 12 pages.
Third Office Action dated Oct. 18, 2016 in connection with Chinese Application No. 201110295196.8, 39 pages.
Extended European Search Report dated Sep. 5, 2016 in connection with European Application No. 11180099.1, 11 pages.
Extended European Search Report dated Sep. 5, 2016 in connection with European Application No. 11180098.3, 12 pages.
Office Action dated Aug. 31, 2016 in connection with U.S. Appl. No. 13/232,431, 13 pages.
Notice of Preliminary Rejection dated Dec. 17, 2016 in connection with Korean Application No. 10-2011-0008606, 24 pages.

* cited by examiner

APPARATUS AND METHOD FOR TURNING E-BOOK PAGES IN PORTABLE TERMINAL

CROSS-REFERENCE TO RELATED APPLICATION(S) AND CLAIM OF PRIORITY

The present application is related to and claims priority under 35 U.S.C. §119(a) to a Korean Patent Application entitled "Apparatus and method for turning e-book pages in portable terminal" filed in the Korean Intellectual Property Office on Oct. 1, 2010 and assigned Serial No. 10-2010-0095815, the contents of which are herein incorporated by reference.

TECHNICAL FIELD OF THE INVENTION

The present invention relates to a portable terminal. More particularly, the present invention relates to an apparatus and method for turning electronic book (e-book) pages in a portable terminal having an e-book function.

BACKGROUND OF THE INVENTION

Portable terminals are in trend of sudden spread due to the convenience of carrying. Accordingly, service providers (i.e., system manufacturers) are competitively developing terminals having special functions to guarantee many users. For example, the portable terminals are providing various functions of phone books, games, schedulers, short messages, the Internet, electronic mail (e-mail) messages, morning wakeup calls, Moving Picture Experts Group Phase 1 (MPEG-1) Audio Layer 3 (MP3) players, digital cameras, electronic dictionaries, e-books and the like.

Recently, an electronic book (e-book), one of information provision media replacing a conventional paper book, has been introduced to show text contents in an electronic display manner. The e-book is of a scheme of, after storing text contents in a flash memory or a built-in hard disk, showing the stored text contents through a display screen. The e-book has an advantage of being capable of, after storing a large amount of book stories at a time, selecting and showing a wanted story.

At this time, the display screen can display only contents of a restricted region. Accordingly, to continuously seamlessly show the next story of the contents, a User Interface (UI) providing a page move or scroll function should be provided. Generally, the e-book can show a story of text contents on a screen while moving through a page up/page down function using a key input means provided in the e-book. Through this method, a user can read the full story of the text contents stored in the e-book.

However, a UI of a scheme of turning pages through key manipulation as above is merely a direction control scheme of the most basic form and is not designed from an ergonomic viewpoint of making turning pages convenient for a user to use. So, there is a problem that the scheme is inconvenient for the user to convert pages of contents naturally.

SUMMARY OF THE INVENTION

To address the above-discussed deficiencies of the prior art, it is a primary object to provide at least the advantages below. Accordingly, one aspect of the present disclosure is to provide an apparatus and method for turning electronic book (e-book) pages in a portable terminal having an e-book function.

Another aspect of the present disclosure is to provide an apparatus and method for turning e-book pages in an analog manner, for enabling a user to convert pages of contents naturally with a feeling as if he/she really turns a book in a portable terminal having an e-book function.

The above aspects are achieved by providing an apparatus and method for turning e-book pages in a portable terminal.

According to one aspect of the present disclosure, a method for turning electronic book (e-book) pages in a portable terminal is provided. The method determines whether a touch is input outside of a predetermined User Interface (UI) activation region of a screen of the portable terminal. The method determines whether a drag and release is input in a direction towards the predetermined UI activation region in response to detecting the touch. The method displays one of a preceding page and a next page on the screen in response to determining that the touch is outside of the predetermined UI activation region and that the drag and release is input in the direction towards the predetermined UI activation region.

According to another aspect of the present disclosure, an apparatus for turning e-book pages in a portable terminal is provided. The apparatus includes a e controller and a display unit. The controller is configured to determine whether a touch is input outside of a predetermined right User Interface (UI) activation region of a screen of the portable terminal. The controller is configured to determine whether a drag and release is input in a direction towards the predetermined UI activation region in response to detecting the touch. The controller is configured to control a display unit to display one of a preceding page and a next page on the screen in response to determining that the touch is outside of the predetermined UI activation region and that the drag and release is input in the direction towards the predetermined UI activation region. The display unit is configured to display, on the screen, one of the preceding page and the next page of the e-book according to control of the controller.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged. Preferred embodiments of the present invention will be described herein below with reference to the accompanying drawings. In the following description, well-known functions or constructions are not described in detail since they would obscure the invention in unnecessary detail. And, terms described below, which are defined considering functions in the present invention, can be different depending on user and operator's intention or practice. Therefore, the terms should be defined on the basis of the disclosure throughout this specification.

Embodiments of the present disclosure provide a way of turning electronic book (e-book) pages in an analog manner in a portable terminal having an e-book function.

In the following description, portable terminals are meaning inclusive of all of a cellular phone with a touch panel, a Personal Communication System (PCS), a Personal Data Assistant (PDA), an International Mobile Telecommunication-2000 (IMT-2000) terminal and/or any other portable terminal suitable for displaying content. The following description is made using general constructions of the examples.

Figure 1:
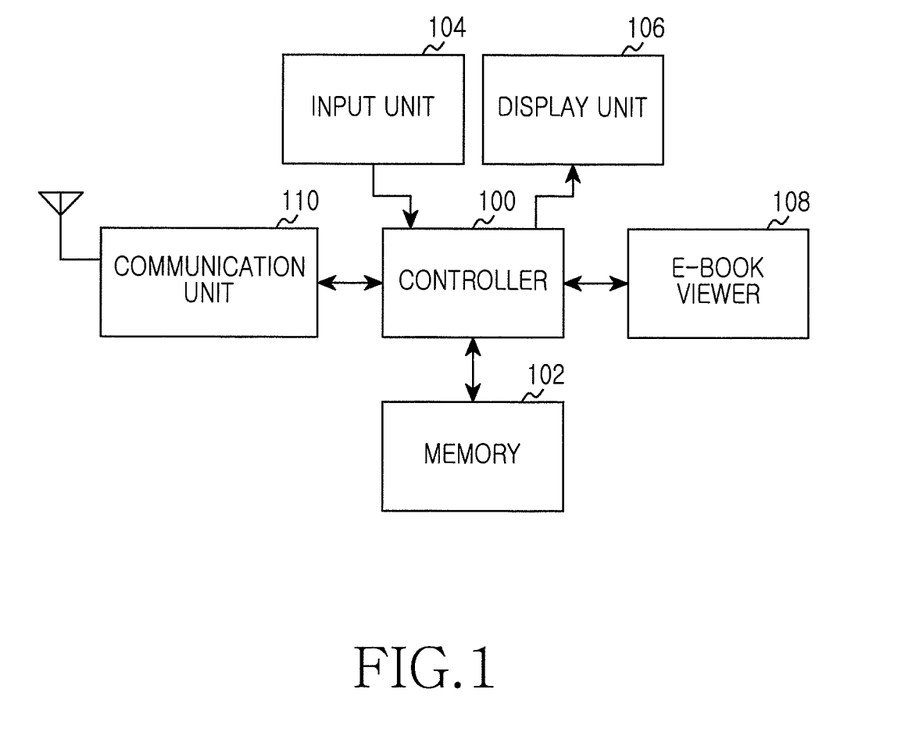
FIG. 1 is a block diagram illustrating an apparatus construction of a portable terminal having an electronic book (e-book) function according to the present disclosure.

FIG. 1 is a block diagram illustrating an apparatus construction of a portable terminal having an e-book function according to the present disclosure.

As illustrated in FIG. 1, the portable terminal includes a controller 100, a memory 102, an input unit 104, a display unit 106, an e-book viewer 108, and a communication unit 110.

Referring to FIG. 1, the controller 100 controls a general operation of the portable terminal, and processes a function of turning e-book pages in an analog manner according to the present disclosure.

The memory 102 stores a microcode of a program for processing and controlling the controller 100 and a variety of reference data, temporary data generated in execution of a variety of programs, and a diversity of updateable depository data. In one embodiment, the memory 102 stores a program for turning e-book pages in an analog manner according to the present disclosure.

The input unit 104 has numeral key buttons and a plurality of function key buttons. The input unit 104 provides key button input data corresponding to a key button pressed by a user to the controller 100.

The display unit 106 displays state information generated during operation of the portable terminal, limited number of characters, a large amount of moving pictures and still pictures and the like. In addition to common functions, according to the present disclosure, the display unit 106 is formed in a form of a touch panel and performs a function of the input unit 104. That is, the display unit 106 senses a user's touch input and transmits the sensed touch input to the controller 100.

The e-book viewer 108 performs a role of turning an e-book by one page/by several pages in an analog manner such that a user can convert pages of contents naturally with a feeling as if he/she really turns a book. Further, the e-book viewer 108 supports a bookmark for the e-book.

The communication unit 110 performs a function of transmitting/receiving and processing a wireless signal input/output through an antenna. For example, in a transmission mode, the communication unit 110 performs a function of processing original data through channel coding and spreading, converting the original data into a Radio Frequency (RF) signal, and transmitting the RF signal. In a reception mode, the communication unit 110 performs a function of processing a received RF signal through de-spreading and channel decoding, and restoring the signal to original data.

Figure 2A:
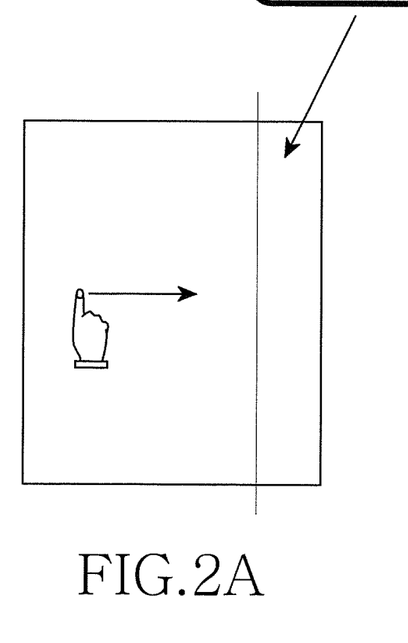
FIGS. 2A and 2B are example diagrams illustrating a method for turning an e-book by one page in an analog manner in a portable terminal having an e-book function according to an embodiment of the present disclosure.
Figure 2B:
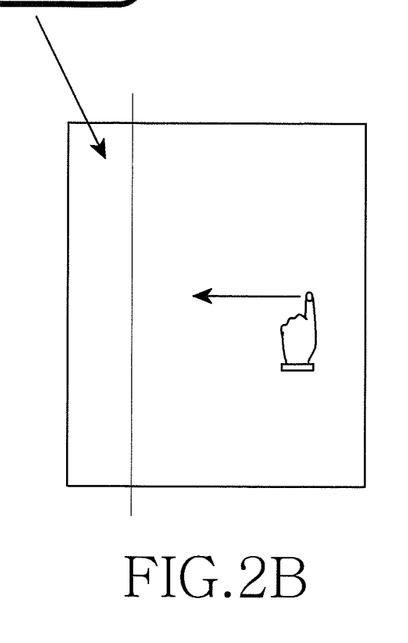

FIGS. 2A and 2B are example diagrams illustrating a method for turning an e-book by one page in an analog manner in a portable terminal having an e-book function according to an embodiment of the present disclosure.

Referring to FIGS. 2A and 2B, the terminal executes the e-book function, and displays, on a screen, a preset page of an e-book selected by a user. Here, a right partial region of the screen is defined as a right UI activation region, and a left partial region of the screen is defined as a left UI activation region. Here, the right UI activation region and the left UI activation region are preset suitable to a corresponding terminal.

As illustrated in FIG. 2A, if a touch is input more left than the predetermined right UI activation region of the e-book and then, in a state where the touch is input, a drag and release is input in the right direction, the terminal displays the just preceding page on the screen. As illustrated in FIG. 2B, if a touch is input more right than the predetermined left UI activation region of the e-book and then, in a state where the touch is input, a drag and release is input in the left direction, the terminal displays the just next page on the screen.

Figure 3:
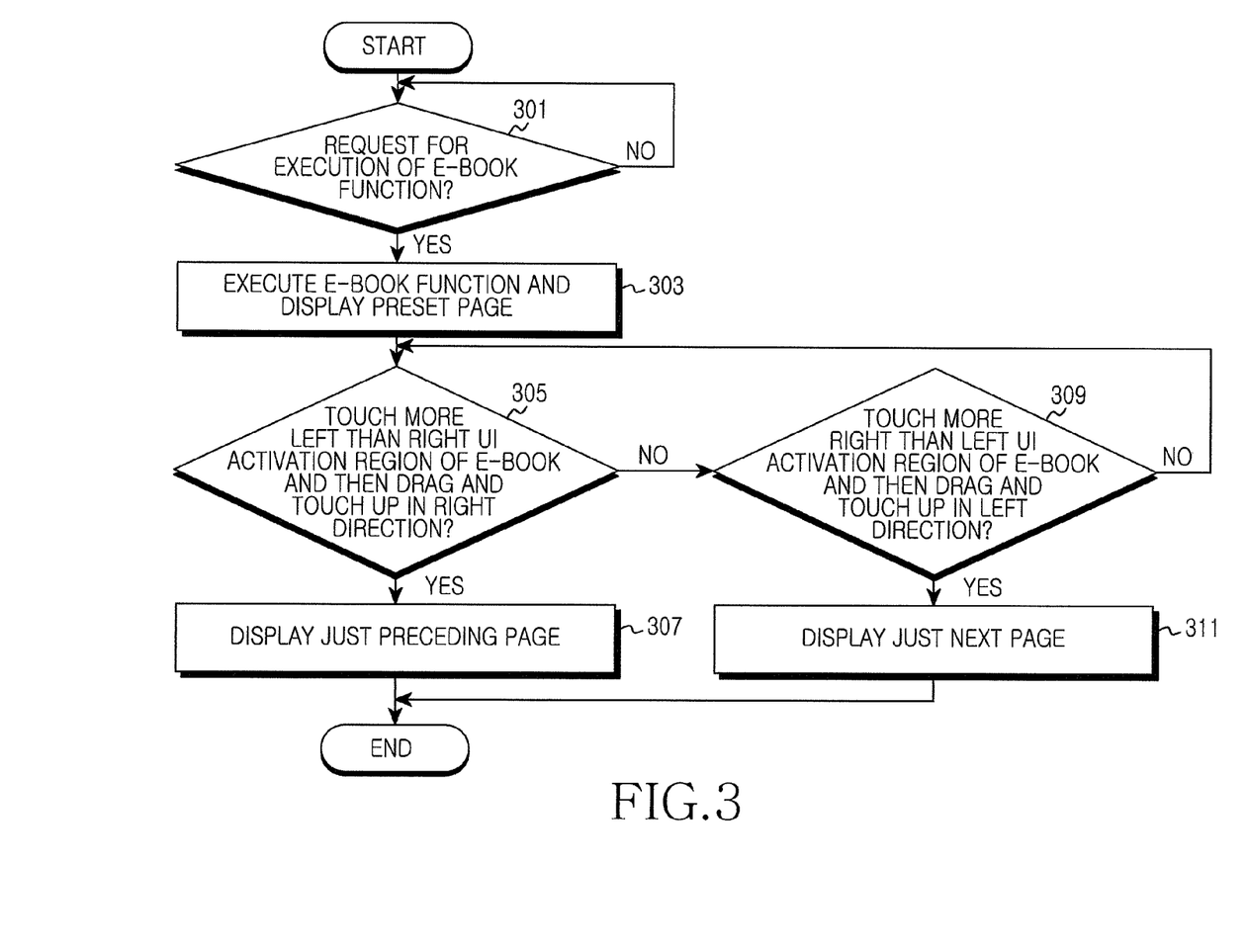
FIG. 3 is a flowchart illustrating a method for turning an e-book by one page in an analog manner in a portable terminal having an e-book function according to an embodiment of the present disclosure.

FIG. 3 is a flowchart illustrating a method for turning an e-book by one page in an analog manner in a portable terminal having an e-book function according to an embodiment of the present disclosure.

Referring to FIG. 3, in block 301, the terminal determines if a request for execution of an e-book function is sensed according to user's key manipulation.

When the terminal determines in block 301 that the request for execution of the e-book function is sensed, in block 303, the terminal executes the e-book function and, according to setting information of the e-book function, displays a preset page of an e-book selected by a user. For example, the setting information of the e-book function can be preset to display the first page of a corresponding e-book or display the previously last displayed page of the corresponding e-book at the time of execution of the e-book function.

After that, in block 305, the terminal determines if a touch is input more left than a predetermined right UI activation region of the e-book and then, in a state where the touch is input, a drag and release is input in the right direction.

When the terminal determines in block 305 that the touch is input more left than the predetermined right UI activation region of the e-book and then, in the state where the touch is input, the drag and release is input in the right direction, in block 307, the terminal displays the just preceding page on the screen.

In contrast, when the terminal determines in block 305 that the touch is not input more left than the predetermined right UI activation region of the e-book and then, in the state where the touch is input, the drag and release is input in the right direction, in block 309, the terminal determines if a touch is input more right than a predetermined left UI activation region of the e-book and then, in a state where the touch is input, a drag and release is input in the left direction.

When the terminal determines in block 309 that the touch is input more right than the predetermined left UI activation region of the e-book and then, in the state where the touch is input, the drag and release is input in the left direction, in block 311, the terminal displays the just next page on the screen.

In contrast, when the terminal determines in block 309 that the touch is not input more right than the predetermined left UI activation region of the e-book and then, in the state where the touch is input, the drag and release is input in the left direction, the terminal returns to block 305 and performs the subsequent blocks.

After that, the terminal terminates the algorithm according to the embodiment of the present disclosure.

Figure 4A:
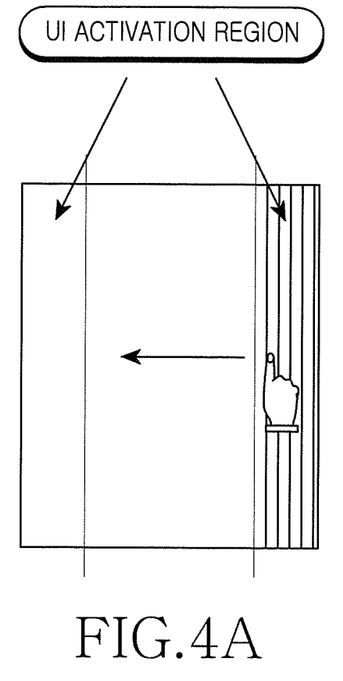
FIGS. 4A and 4B are example diagrams illustrating a method for turning an e-book by several pages in an analog manner in a portable terminal having an e-book function according to an embodiment of the present disclosure.
Figure 4B:
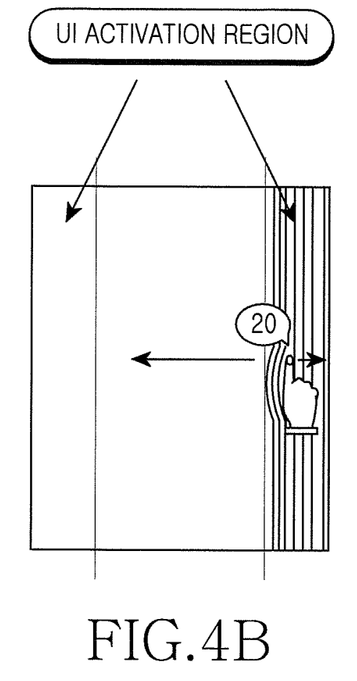

FIGS. 4A and 4B are example diagrams illustrating a method for turning an e-book by several pages in an analog manner in a portable terminal having an e-book function according to an embodiment of the present disclosure.

Referring to FIGS. 4A and 4B, the terminal executes the e-book function, and displays, on a screen, a preset page of an e-book selected by a user. Here, a right partial region of the screen is defined as a right UI activation region, and a left partial region of the screen is defined as a left UI activation region. Here, the right UI activation region and the left UI activation region are preset suitable to a corresponding terminal.

If a touch is input in the predetermined right UI activation region of the e-book, the terminal displays the right side of the e-book. At this time, as illustrated in FIG. 4A, if a drag and release is input in the left direction in a state where the touch is input in the predetermined right UI activation region, the terminal displays the just next page on the screen.

In contrast, as illustrated in FIG. 4B, if a drag is input in the right direction in a state where the touch is input in the predetermined right UI activation region, the terminal displays the number of pages increasing as much as the dragging on the right side of the e-book and, if a drag and release is input in the left direction in a state where the drag is input in the right direction, the terminal displays a next page corresponding to the number of the increased pages.

Although not illustrated, if a touch is input in the predetermined left UI activation region of the e-book, the terminal displays the left side of the e-book. At this time, if a drag and release is input in the right direction in a state where the touch is input in the predetermined left UI activation region, the terminal displays the just preceding page on the screen. In contrast, if a drag is input in the left direction in the state where the touch is input in the predetermined left UI activation region, the terminal displays the number of pages decreasing as much as the dragging on the left side of the e-book and, if a drag and release is input in the right direction in a state where the drag is input in the left direction, the terminal displays a preceding page corresponding to the number of the decreased pages.

Figure 5A:
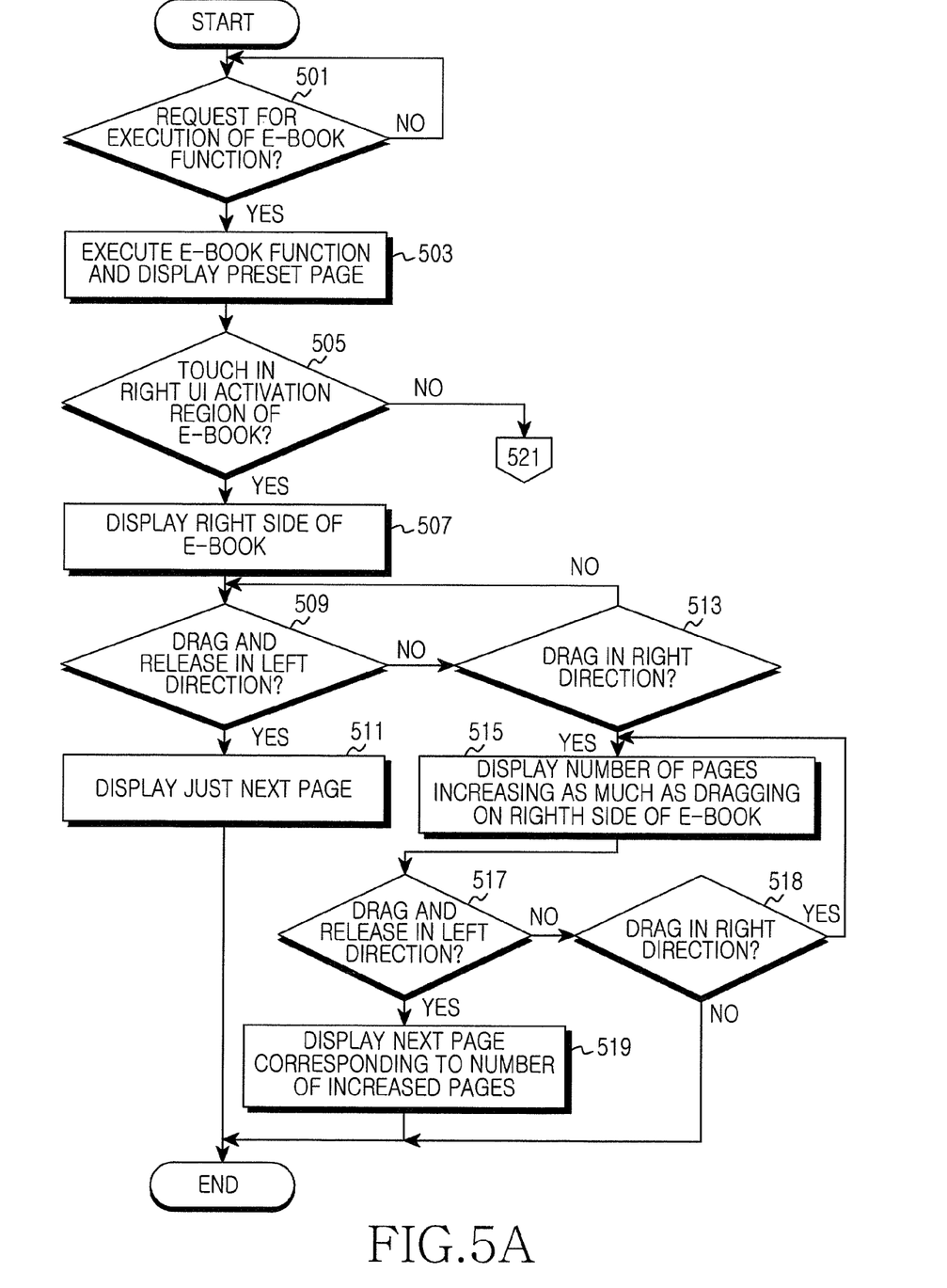
FIGS. 5A and 5B are a flowchart illustrating a method for turning an e-book by several pages in an analog manner in a portable terminal having an e-book function according to an embodiment of the present disclosure.
Figure 5B:
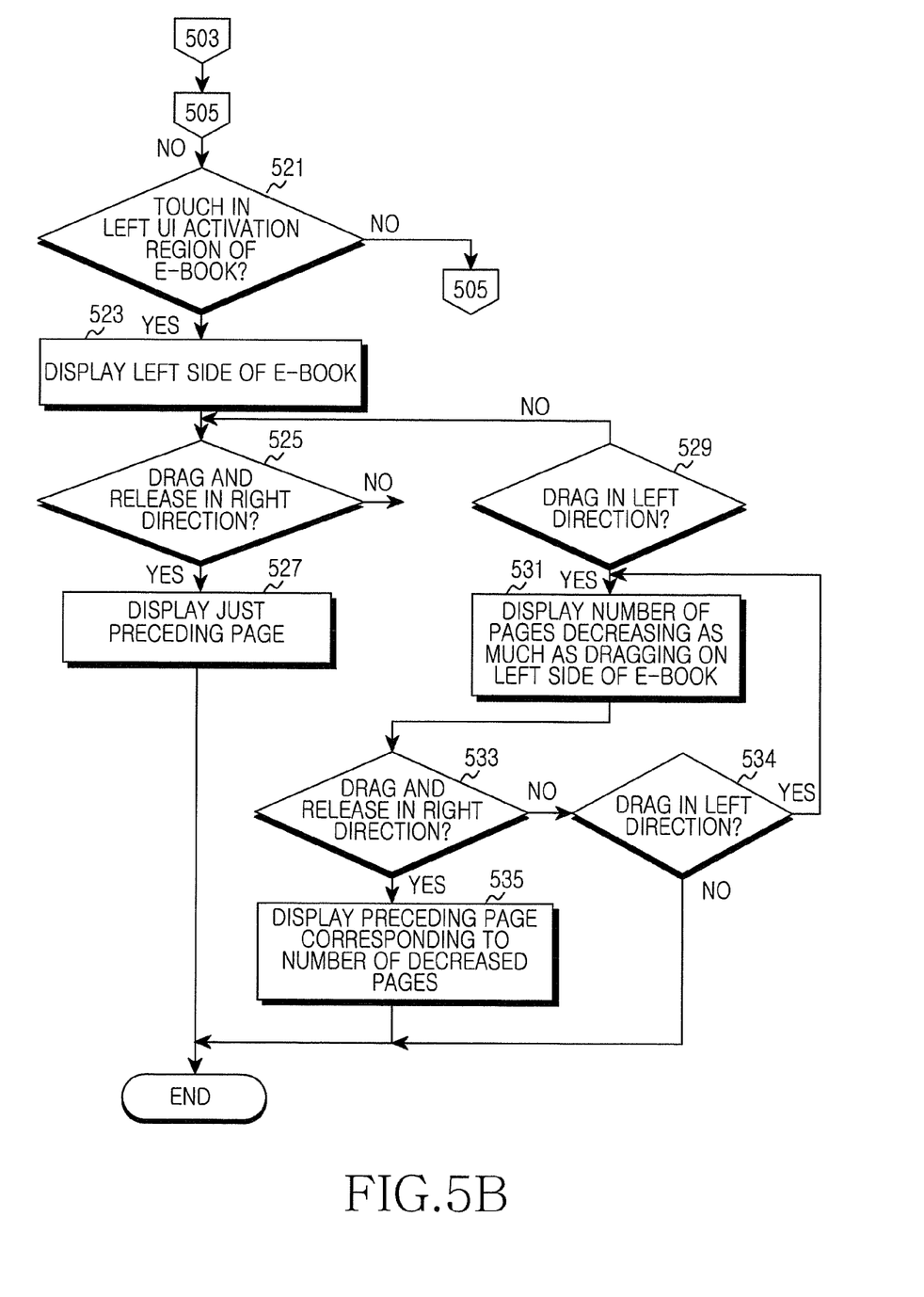

FIGS. 5A and 5B are a flowchart illustrating a method for turning an e-book by several pages in an analog manner in a portable terminal having an e-book function according to an embodiment of the present disclosure.

Referring to FIGS. 5A and 5B, in block 501, the terminal determines if a request for execution of an e-book function is sensed according to user's key manipulation.

When the terminal determines in block 501 that the request for execution of the e-book function is sensed, in block 503, the terminal executes the e-book function and, according to setting information of the e-book function, displays a preset page of an e-book selected by a user. For example, the setting information of the e-book function can be preset to display the first page of a corresponding e-book or display the previously last displayed page of the corresponding e-book at the time of execution of the e-book function.

After that, in block 505, the terminal determines if a touch is input in a predetermined right UI activation region of the e-book.

When the terminal determines in block 505 that the touch is input in the predetermined right UI activation region of the e-book, in block 507, the terminal displays the right side of the e-book, and proceeds to block 509.

Next, in block 509, the terminal determines if a drag and release is input in the left direction in a state where the touch is input in the predetermined right UI activation region.

When the terminal determines in block 509 that the drag and release is input in the left direction in the state where the touch is input in the predetermined right UI activation region, in block 511, the terminal displays the just next page on the screen.

In contrast, when the terminal determines in block 509 that the drag and release is not input in the left direction in the state where the touch is input in the predetermined right UI activation region, in block 513, the terminal determines if a drag is input in the right direction in the state where the touch is input in the predetermined right UI activation region.

When the terminal determines in block 513 that the drag is input in the right direction in the state where the touch is input in the predetermined right UI activation region, in block 515, the terminal displays the number of pages increasing as much as the dragging on the right side of the e-book and then, proceeds to block 517. Here, the number of pages displayed on the right side increases more and more quickly according to the dragging.

After that, in block 517, the terminal determines if a drag and release is input in the left direction in the state where the drag is input in the right direction.

When the terminal determines in block 517 that the drag and release is input in the left direction in the state where the drag is input in the right direction, in block 519, the terminal displays a next page corresponding to the number of the increased pages.

When the terminal determines in block 517 that the drag and release is not input in the left direction in the state where the drag is input in the right direction, in block 518, the terminal determines if in the state where the drag is input in the right direction, a drag is continuously input in the right direction.

When the terminal determines in block 518 that, in the state where the drag is input in the right direction, the drag is continuously input in the right direction, the terminal returns to block 515 and performs the subsequent blocks.

In contrast, when the terminal determines in block 518 that, in the state where the drag is input in the right direction, the drag is not continuously input in the right direction, the terminal terminates the algorithm according to the embodiment of the present disclosure. For example, in the state where the drag is input in the right direction, when a release is detected without a drag of the left direction or right direction, the terminal terminates the algorithm according to the embodiment of the present disclosure.

In contrast, when the terminal determines in block 513 that the drag is not input in the right direction in the state where the touch is input in the predetermined right UI activation region, the terminal returns to block 509 and performs the subsequent blocks.

In contrast, when the terminal determines in block 505 that the touch is not input in the predetermined right UI activation region of the e-book, in block 521, the terminal determines if a touch is input in a predetermined left UI activation region of the e-book.

When the terminal determines in block 521 that the touch is input in the predetermined left UI activation region of the e-book, in block 523, the terminal displays the left side of the e-book, and proceeds to block 525.

After that, in block 525, the terminal determines if a drag and release is input in the right direction in the state where the touch is input in the predetermined left UI activation region.

When the terminal determines in block 525 that the drag and release is input in the right direction in the state where the touch is input in the predetermined left UI activation region, in block 527, the terminal displays the just preceding page on the screen.

In contrast, when the terminal determines in block 525 that the drag and release is not input in the right direction in the state where the touch is input in the predetermined left UI activation region, in block 529, the terminal determines if a drag is input in the left direction in the state where the touch is input in the predetermined left UI activation region.

When the terminal determines in block 529 that the drag is input in the left direction in the state where the touch is input in the predetermined left UI activation region, in block 531, the terminal displays the number of pages decreasing as much as the dragging on the left side of the e-book and then, proceeds to block 533. Here, the number of pages displayed on the left side decreases more and faster according to the dragging.

Next, in block 533, the terminal determines if a drag and release is input in the right direction in the state where the drag is input in the left direction.

When the terminal determines in block 533 that the drag and release is input in the right direction in the state where the drag is input in the left direction, in block 535, the terminal displays a preceding page corresponding to the number of the decreased pages.

In contrast, when the terminal determines in block 533 that the drag and release is not input in the right direction in the state where the drag is input in the left direction, in block 534, the terminal determines if, in the state where the drag is input in the left direction, a drag is continuously input in the left direction.

When the terminal determines in block 534 that, in the state where the drag is input in the left direction, the drag is continuously input in the left direction, the terminal returns to block 531 and performs the subsequent blocks.

In contrast, when the terminal determines in block 534 that, in the state where the drag is input in the left direction, the drag is not continuously input in the left direction, the terminal terminates the algorithm according to the embodiment of the present disclosure. For instance, in the state where the drag is input in the left direction, when a release is detected without a drag of the left direction or right direction, the terminal terminates the algorithm according to the embodiment of the present disclosure.

In contrast, when the terminal determines in block 529 that the drag is not input in the left direction in the state where the touch is input in the predetermined left UI activation region, the terminal returns to block 525 and performs the subsequent blocks.

In contrast, when the terminal determines in block 521 that the touch is not input in the predetermined left UI activation region of the e-book, the terminal returns to block 505 and performs the subsequent blocks.

After that, the terminal terminates the algorithm according to the embodiment of the present disclosure.

Figure 6A:
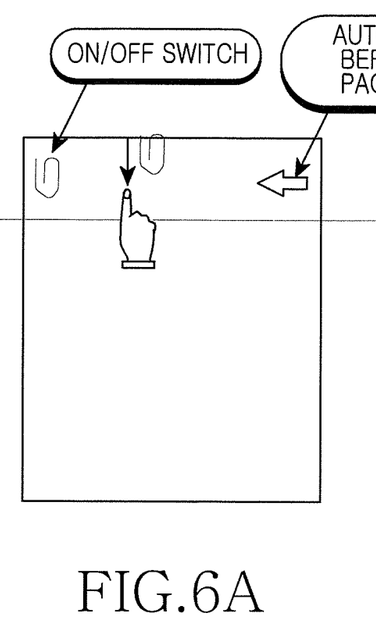
FIGS. 6A and 6B are example diagrams illustrating a method for supporting a bookmark for an e-book in a portable terminal having an e-book function according to an embodiment of the present disclosure.
Figure 6B:
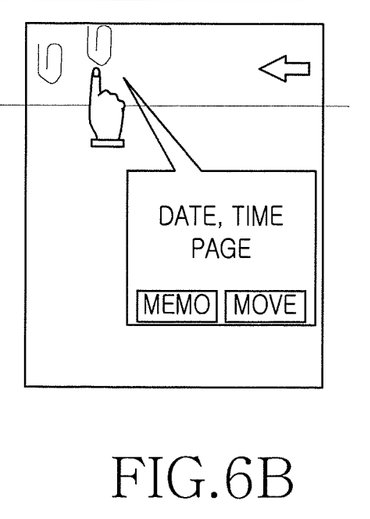

FIGS. 6A and 6B are example diagrams illustrating a method for supporting a bookmark for an e-book in a portable terminal having an e-book function according to an embodiment of the present disclosure.

Referring to FIGS. 6A and 6B, the terminal executes the e-book function and displays, on a screen, a preset page of an e-book selected by a user. After that, the terminal touches a bookmark On/Off switch to activate a bookmark function. At this time, an upper partial region of the screen is defined as an upper UI activation region, and the upper UI activation region is preset suitable to a corresponding terminal. The bookmark On/Off switch for activation/deactivation of the bookmark function can be positioned left in the predetermined upper UI activation region of the e-book. For example, the bookmark On/Off switch can be displayed in a clip shape. Further, a menu for automatically storing a position before moving to a bookmark page corresponding to a clip can be positioned right in the predetermined upper UI activation region of the e-book. For example, the menu can be displayed in an arrow shape.

As illustrated in FIG. 6A, if a touch is input in the predetermined upper UI activation region of the e-book and then, in a state where the touch is input, a drag is input in the downward direction, the terminal determines that there is a request for addition of a bookmark, and generates a clip corresponding to a bookmark to be added. Here, a position of the clip can move along a drag direction until before a release is detected in a state where the drag is input in the downward direction. After that, if a release is input in the state where the drag is input in the downward direction, the terminal positions the generated clip in a position where the release is detected. Here, a shape, color and the like of the generated clip can be set according to preset information. As a different method, the terminal may position the generated clip in a position where the release is detected and simultaneously, display an input window through a popup window, receive an input of information of a shape, color and the like of the generated clip from a user, and change the shape, color and the like of the generated clip according to the received information.

As illustrated in FIG. 6B, if a touch is input for a clip corresponding to a previously added bookmark, the terminal displays a corresponding bookmark page. If a long touch is sensed for the clip corresponding to the previously added bookmark, whose bookmark page has been displayed, the terminal determines that there is a request for displaying of information on the previously added bookmark, and displays the information on the previously added bookmark through a popup window. Here, the long touch represents a continuous touch for a predetermined period of time. In one example, the predetermined period of time may be one or two seconds. The information on the bookmark can include, for example, information of a generation date of the bookmark, a generation time, a bookmark page and/or any other information regarding the bookmark. Further, the popup window can display not only information on a corresponding bookmark but also a memo menu for memo composition and a move menu for position change of the bookmark. In this example, if the memo menu is selected from a user, the terminal can display a memo window and receive an input of memos to be written about the bookmark. If the move menu is selected from the user, the terminal can perform a bookmark position change mode and receive an input of a changed position of a clip corresponding to the bookmark.

Although not illustrated, if a touch is input for a clip corresponding to a previously added bookmark, the terminal displays a corresponding bookmark page. If a drag and release is input in the left/right direction in a state where the touch is input for the clip corresponding to the previously added bookmark, whose bookmark page has been displayed, the terminal determines that there is a request for movement to the bookmark page corresponding to the previously added bookmark, and moves to the bookmark page.

Although not illustrated, if a touch is input for a clip corresponding to a previously added bookmark and then, in a state where the touch is input, a drag and release is input in the upward direction, the terminal determines that there is a request for deletion of the previously added bookmark, and deletes a clip corresponding to the previously added bookmark.

Figure 7A:
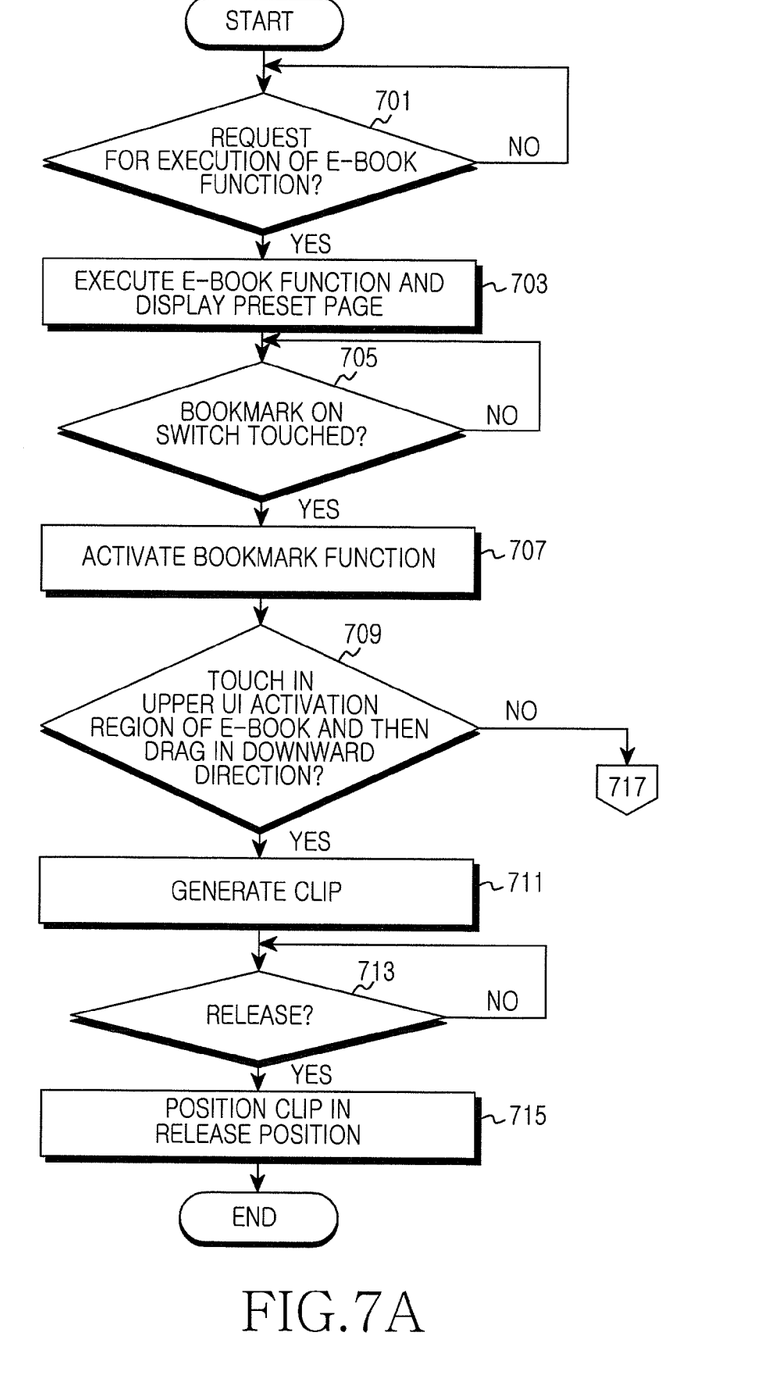
FIGS. 7A and 7B are a flowchart illustrating a method for supporting a bookmark for an e-book in a portable terminal having an e-book function according to an embodiment of the present disclosure.
Figure 7B:
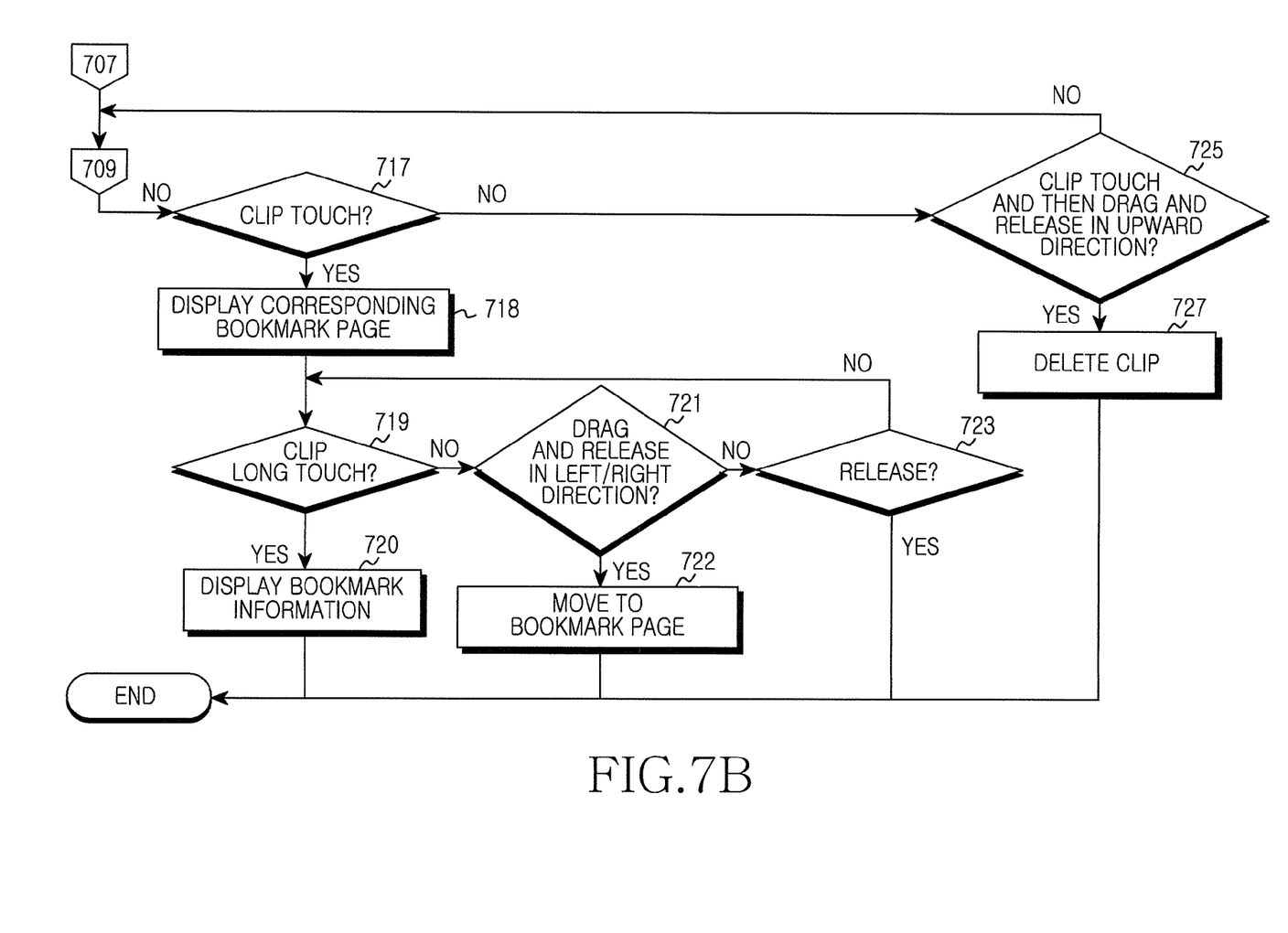

FIGS. 7A and 7B are a flowchart illustrating a method for supporting a bookmark for an e-book in a portable terminal having an e-book function according to an embodiment of the present disclosure.

Referring to FIGS. 7A and 7B, in block 701, the terminal determines if a request for execution of an e-book function is sensed according to user's key manipulation.

When the terminal determines in block 701 that the request for execution of the e-book function is sensed, in block 703, the terminal executes the e-book function and, according to setting information of the e-book function, displays a preset page of an e-book selected by a user. For example, the setting information of the e-book function can be preset to display the first page of a corresponding e-book or display the previously last displayed page of the corresponding e-book at the time of execution of the e-book function.

Next, in block 705, the terminal determines if a bookmark "On" switch is touched (i.e., release after touch). Here, the bookmark "On" switch can be, for example, positioned left in a predetermined upper UI activation region of the e-book, and can be displayed in a clip shape. According to another embodiment of the present disclosure, the bookmark "On" switch may be realized as one switch performing all of the function of a bookmark "On" switch and the function of a bookmark "Off" switch. In this example where the switch is touched in a bookmark "Off" state, the switch can transit to a bookmark "On" state to activate a bookmark function. In an example where the switch is touched in the bookmark "On" state, the switch can transit to the bookmark "Off" state to deactivate the bookmark function.

When the terminal determines in block 705 that the bookmark "On" switch is touched, in block 707, the terminal activates the bookmark function and then, proceeds to block 709.

Next, in block 709, the terminal determines if a touch is input in the predetermined upper UI activation region of the e-book and then, in a state where the touch is input, a drag is input in the downward direction.

When the terminal determines in block 709 that the touch is input in the predetermined upper UI activation region of the e-book and then, in the state where the touch is input, the drag is input in the downward direction, the terminal determines that there is a request for addition of a bookmark and, in block 711, generates a clip corresponding to a bookmark to be added and proceeds to block 713. Here, a position of the clip can move along a drag direction until before a release is detected in a state where the drag is input in the downward direction.

Next, in block 713, the terminal determines if a release is detected in the state where the drag is input in the downward direction.

When the terminal determines in block 713 that the release is input in the state where the drag is input in the downward direction, in block 715, the terminal positions the generated clip in a position where the release is detected, and terminates the algorithm according to the embodiment of the present disclosure. Here, a shape, color and the like of the generated clip can be set according to preset information. In another example, the terminal may position the generated clip in the position where the release is detected and simultaneously display an input window through a popup window, receive an input of information of the shape, color and the like of the generated clip from a user, and change the shape, color and the like of the generated clip according to the received information.

In contrast, when the terminal determines in block 709 that the touch is input in the predetermined upper UI activation region of the e-book and then, in the state where the touch is input, the drag is not input in the downward direction, in block 717, the terminal determines if a touch is input for a clip corresponding to a previously added bookmark.

When the terminal determines in block 717 that the touch is input for the clip corresponding to the previously added bookmark, in block 718, the terminal displays a corresponding bookmark page, and proceeds to block 719.

Next, in block 719, the terminal determines if a long touch is sensed for the clip corresponding to the previously added bookmark, whose bookmark page has been displayed. Here, the long touch represents a continuous touch for a predetermined period of time. In one example, the predetermined period of time may be one or two seconds.

When the terminal determines in block 719 that the long touch is sensed for the clip corresponding to the previously added bookmark, whose bookmark page has been displayed, the terminal determines that there is a request for displaying of information on the previously added bookmark, whose bookmark page has been displayed and, in block 720, displays the information on the previously added bookmark through a popup window and terminates the algorithm according to the embodiment of the present disclosure. Here, the information on the bookmark can include information of a generation date of the bookmark, a generation time, a bookmark page and the like. Further, the popup window can display not only information on a corresponding bookmark but also a memo menu for memo composition and a move menu for position change of a corresponding bookmark. In this example, if the memo menu is selected from a user, the terminal can display a memo window and receive an input of memos to be written about the bookmark. If the move menu is selected from the user, the terminal can perform a bookmark position change mode and receive an input of a changed position of a clip corresponding to the bookmark.

In contrast, when the terminal determines in block 719 that the long touch is not sensed for the clip corresponding to the previously added bookmark, whose bookmark page has been displayed, in block 721, the terminal determines if a drag and release is detected in the left/right direction in a state where the touch is input for the clip corresponding to the previously added bookmark.

When the terminal determines in block 721 that the drag and release is input in the left/right direction in the state where the touch is input for the clip corresponding to the previously added bookmark, the terminal determines that there is a request for movement to the bookmark page corresponding to the previously added bookmark, which has been displayed and, in block 722, moves to the bookmark page and terminates the algorithm according to the embodiment of the present disclosure.

In contrast, when the terminal determines in block 721 that the drag and release is not input in the left/right direction in the state where the touch is input for the clip corresponding to the previously added bookmark, in block 723, the terminal determines if a release is detected in the state where the touch is input for the clip corresponding to the previously added bookmark.

When the terminal determines in block 723 that the release is detected in the state where the touch is input for the clip corresponding to the previously added bookmark, the terminal terminates the algorithm according to the embodiment of the present disclosure.

In contrast, when the terminal determines in block 723 that the release is not detected in the state where the touch is input for the clip corresponding to the previously added bookmark, the terminal returns to block 719 and performs the subsequent blocks.

In contrast, when the terminal determines in block 717 that the touch is not input for the clip corresponding to the previously added bookmark, in block 725, the terminal determines if a touch is input for a clip corresponding to a previously added bookmark and then, in a state where the touch is input, a drag and release is input in the upward direction (e.g., till the end of the upward direction).

When the terminal determines in block 725 that the touch is input for the clip corresponding to the previously added bookmark and then, in the state where the touch is input, the drag and release is input in the upward direction, the terminal determines that there is a request for deletion of the previously added bookmark and, in block 727, the terminal deletes the clip corresponding to the previously added bookmark and terminates the algorithm according to the embodiment of the present disclosure.

In contrast, when the terminal determines in block 725 that the touch is input for the clip corresponding to the previously added bookmark and then, in the state where the touch is input, the drag and release is not input in the upward direction, the terminal returns to block 709 and performs the subsequent blocks.

Next, the terminal terminates the algorithm according to the embodiment of the present disclosure.

As described above, embodiments of the present invention have an advantage that, although not learning an equipment use method, a user can convert pages of contents naturally with a feeling as if he or she is really turning pages in a book, by providing a UI of turning e-book pages in an analog manner in a portable terminal having an e-book function.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for turning electronic book (e-book) pages in a portable terminal, the method comprising:
   defining a first partial region of a screen of the portable terminal on a first side as a first user interface (UI) activation region, a second partial region of the screen on an opposing side as a second UI activation region, and a middle region of the screen between the first UI activation region and the second partial region, the screen comprising a touchscreen;
   displaying at least one page of an e-book on the screen;
   receiving a first input having a start position, a first direction, and an end position, the first input comprising a dragged gesture on the touchscreen;
   determining whether the start position of the first input is in the first UI activation region, the second UI activation region, or the middle region of the screen;
   in response to determining that the start position is in the middle region of the screen:
      determining whether the first direction of the first input is towards the first UI activation region or the second UI activation region;
      in response to determining that the first direction of the first input is towards the first UI activation region, displaying a just previous page on the screen; and
      in response to determining that the first direction of the first input is towards the second UI activation region, displaying a just next page on the screen;
   in response to determining that the start position of the first input is in the first UI activation region:
      displaying a right side of the e-book;
      determining whether the first direction of the first input is towards the second UI activation region or towards a right edge of the screen;
      in response to determining that the first direction is towards the second UI activation region, displaying the just next page on the screen; and
      in response to determining that the first direction is towards the right edge of the screen:
         displaying a number of pages to be increased relative to the displayed at least one page;

determining that the first input further comprises a second direction prior to the end position; and
in response to determining that the first input further comprises the second direction, displaying a page corresponding to the number of pages to be increased;
in response to determining that the start position of the first input is in the second UI activation region:
displaying a left side of the e-book;
determining whether the first direction of the first input is towards the first UI activation region or towards a left edge of the screen;
in response to determining that the first direction is towards the second UI activation region, displaying the just previous page on the screen; and
in response to determining that the first direction is towards the left edge of the screen:
displaying a number of pages to be decreased relative to the displayed at least one page;
determining that the first input further comprises the second direction prior to the end position; and
in response to determining that the first input further comprises the second direction, displaying a page corresponding to the number of pages to be decreased.

2. The method of claim 1, further comprising:
determining whether a bookmark switch is touched in a predetermined bookmark UI activation region of the screen; and
responsive to determining that the bookmark switch is touched in the predetermined bookmark UI activation region of the screen, activating a bookmark function.

3. The method of claim 2, further comprising:
determining whether a touch is input for a clip corresponding to a previously added bookmark in the e-book;
responsive to determining that the touch is input for the clip corresponding to the previously added bookmark in the e-book, displaying a page corresponding to the previously added bookmark;
determining whether a long touch is sensed for the clip whose bookmark page has been displayed; and
responsive to determining that the long touch is sensed for the clip whose bookmark page has been displayed, displaying information about the previously added bookmark.

4. The method of claim 2, further comprising:
determining whether a touch is input for a clip corresponding to a previously added bookmark in the e-book;
responsive to determining that the touch is input for the clip corresponding to the previously added bookmark in the e-book, displaying a page corresponding to the previously added bookmark;
determining whether a drag and release associated with a touch for the clip whose bookmark page has been displayed is input in one of a first direction or a second direction; and
responsive to determining that the drag and release associated with the touch for the clip whose bookmark page has been displayed is input in one of the first direction or the second direction, moving to the page corresponding to the previously added bookmark.

5. The method of claim 2, further comprising:
determining whether a touch is input for a clip corresponding to a previously added bookmark in the e-book and then a drag and release is input in a direction towards an edge of the screen; and
responsive to determining that the touch is input for the clip corresponding to the previously added bookmark in the e-book and then the drag and release is input in the direction towards an edge of the screen, deleting the clip corresponding to the previously added bookmark.

6. The method of claim 1, wherein the number of pages to be increased or decreased varies nonlinearly according to a distance between a first touch location before the dragged gesture and a second touch location after the dragged gesture.

7. An apparatus in a portable terminal, the apparatus for turning electronic book (e-book) pages, the apparatus comprising:
a display unit comprising a touch panel operably connected to a screen of the portable terminal; and
a controller comprising hardware, the controller configured to:
define a first partial region of a screen of the portable terminal on a first side as a first user interface (UI) activation region, a second partial region of the screen on the opposing side as a second UI activation region, and a middle region of the screen between the first UI activation region and the second partial region;
control the display unit to display displaying at least one page of an e-book on the screen;
receive a first input having a start position, a first direction, and an end position, the first input comprising a dragged gesture on the touch panel;
determine whether the start position of the first input is in the first UI activation region, the second UI activation region, or the middle region of the screen;
in response to determining that the start position is in the middle region of the screen:
determine whether the first direction of the first input is towards the first UI activation region or the second UI activation region;
in response to determining that the first direction of the first input is towards the first UI activation region, control the display unit to display a just previous page on the screen; and
in response to determining that the first direction of the first input is towards the second UI activation region, control the display unit to display a just next page on the screen;
in response to determining that the start position of the first input is in the first UI activation region:
control the display unit to display a right side of the e-book;
determine whether the first direction of the first input is towards the second UI activation region or towards a right edge of the screen;
in response to determining that the first direction is towards the second UI activation region, control the display unit to display the just next page on the screen; and
in response to determining that the first direction is towards the right edge of the screen:
control the display unit to display a number of pages to be increased relative to the displayed at least one page;
determine the first input further comprises a second direction prior to the end position; and
in response to determining that the first input further comprises the second direction, control the display unit to display a page corresponding to the number of pages to be increased;
in response to determining that the start position of the first input is in the second UI activation region:
control the display unit to display a left side of the e-book;
determine whether the first direction of the first input is towards the first UI activation region or towards a left edge of the screen;
in response to determining that the first direction is towards the second UI activation region, control the display unit to display the just previous page on the screen; and
in response to determining that the first direction is towards the left edge of the screen:
display a number of pages to be decreased relative to the displayed at least one page;
determine that the first input further comprises the second direction prior to the end position; and
in response to determining that the first input further comprises the second direction, control the display unit to display a page corresponding to the number of pages to be decreased.

8. The apparatus of claim 7, wherein the controller is further configured to determine whether a bookmark switch is touched in a predetermined bookmark UI activation region of the screen, and activate a bookmark function in response to determining that the bookmark switch is touched in the predetermined bookmark UI activation region of the e-book.

9. The apparatus of claim 8, wherein the controller is further configured to determine whether a touch is input for a clip corresponding to a previously added bookmark in the e-book, control the display unit to display a page corresponding to the previously added bookmark in response to determining that the touch is input for the clip corresponding to the previously added bookmark in the e-book, determine whether a long touch is sensed for the clip whose bookmark page has been displayed, and control the display unit to display information about the previously added bookmark in response to determining that the long touch is sensed for the clip whose bookmark page has been displayed.

10. The apparatus of claim 8, wherein the controller is further configured to determine whether a touch is input for a clip corresponding to a previously added bookmark in the e-book, control the display unit to display a page corresponding to the previously added bookmark in response to determining that the touch is input for the clip corresponding to the previously added bookmark in the e-book, determine whether a drag and release associated with a touch for the clip whose bookmark page has been displayed is input in one of a first direction or a second direction, and control the display unit to move to the page corresponding to the previously added bookmark in response to determining that the drag and release associated with the touch for the clip whose bookmark page has been displayed is input in one of the first direction or the second direction.

11. The apparatus of claim 8, wherein the controller is further configured to determine whether a touch is input for a clip corresponding to a previously added bookmark in the e-book and then a drag and release is input in a direction towards an edge of the screen, and delete a clip corresponding to the previously added bookmark in response to determining that the touch is input for the clip corresponding to the previously added bookmark in the e-book and then the drag and release is input in the direction towards an edge of the screen.

12. The apparatus of claim 7, wherein the number of pages to be increased or decreased varies nonlinearly according to a distance between a first touch location before the dragged gesture and a second touch location after the dragged gesture.

* * * * *